United States Patent
Mamchuk et al.

(10) Patent No.: US 10,752,242 B2
(45) Date of Patent: Aug. 25, 2020

(54) SYSTEM AND METHOD FOR CONTROL OF AN AUTONOMOUS VEHICLE

(71) Applicant: GM GLOBAL TECHNOLOGY OPERATIONS LLC, Detroit, MI (US)

(72) Inventors: Tetyana V. Mamchuk, Walled Lake, MI (US); Gabriel T. Choi, Novi, MI (US); Paul A. Adam, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 101 days.

(21) Appl. No.: 16/194,960

(22) Filed: Nov. 19, 2018

(65) Prior Publication Data

US 2020/0156626 A1 May 21, 2020

(51) Int. Cl.
| | | |
|---|---|---|
| *G05D 1/00* | (2006.01) | |
| *B60W 30/09* | (2012.01) | |
| *B60W 10/04* | (2006.01) | |
| *B60W 10/18* | (2012.01) | |
| *B60W 10/20* | (2006.01) | |
| *B60W 10/10* | (2012.01) | |

(52) U.S. Cl.
CPC ............ *B60W 30/09* (2013.01); *B60W 10/04* (2013.01); *B60W 10/10* (2013.01); *B60W 10/18* (2013.01); *B60W 10/20* (2013.01); *B60W 2554/00* (2020.02); *B60W 2554/80* (2020.02); *B60W 2554/801* (2020.02); *B60W 2710/10* (2013.01); *B60W 2710/18* (2013.01); *B60W 2710/20* (2013.01); *B60W 2720/106* (2013.01); *G05D 1/0088* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 8,473,144 | B1 * | 6/2013 | Dolgov | B60W 30/18163 |
| | | | | 701/28 |
| 9,278,689 | B1 * | 3/2016 | Delp | G08G 1/0965 |
| 9,478,137 | B1 * | 10/2016 | Nelson | G08G 1/167 |
| 9,487,212 | B1 * | 11/2016 | Adam | B60W 30/143 |
| 9,598,076 | B1 * | 3/2017 | Jain | B60W 30/09 |
| 9,956,956 | B2 * | 5/2018 | Ali | B60W 30/16 |
| 10,173,685 | B2 * | 1/2019 | Schaper | G06K 9/00791 |
| 10,217,354 | B1 * | 2/2019 | Burke | G07C 5/008 |
| 10,403,140 | B2 * | 9/2019 | Banvait | B60W 30/12 |
| 10,486,712 | B2 * | 11/2019 | Niino | B60W 30/00 |

(Continued)

*Primary Examiner* — Jonathan M Dager

(57) ABSTRACT

An automotive vehicle includes at least one actuator configured to control vehicle steering, shifting, acceleration, or braking, at least one sensor configured to provide signals indicative of a location and velocity of an object external to the vehicle relative to the vehicle, and at least one controller in communication with the at least one actuator and the at least one sensor. The at least one controller is configured to, in response to a signal from the at least one sensor indicating that a relative velocity between a rearward object and the vehicle exceeds a first threshold and a distance between the rearward object and the vehicle falls below a second threshold, automatically control the at least one actuator to maneuver the vehicle from a first lateral position with respect to a current driving lane to a second lateral position with respect to the current driving lane.

4 Claims, 4 Drawing Sheets

(56) References Cited

U.S. PATENT DOCUMENTS

| | | | |
|---|---|---|---|
| 10,549,780 B2* | 2/2020 | Watanabe | B62D 15/0255 |
| 2013/0110368 A1* | 5/2013 | Zagorski | B60T 7/22 |
| | | | 701/70 |
| 2015/0166062 A1* | 6/2015 | Johnson | B60W 30/12 |
| | | | 701/41 |
| 2016/0306357 A1* | 10/2016 | Wieskamp | G08G 1/167 |
| 2018/0025645 A1* | 1/2018 | Schwindt | G08G 1/167 |
| | | | 701/301 |
| 2018/0275650 A1* | 9/2018 | Nelson | B60Q 1/46 |
| 2019/0263410 A1* | 8/2019 | Groult | B60W 40/04 |
| 2019/0315405 A1* | 10/2019 | Oh | B60W 50/0205 |
| 2019/0329780 A1* | 10/2019 | Tomescu | B60W 30/09 |

\* cited by examiner

SYSTEM AND METHOD FOR CONTROL OF AN AUTONOMOUS VEHICLE

INTRODUCTION

The present disclosure relates to vehicles controlled by automated driving systems, particularly those configured to automatically control vehicle steering, acceleration, and braking during a drive cycle without human intervention.

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

An automotive vehicle according to the present disclosure includes at least one actuator configured to control vehicle steering, shifting, acceleration, or braking. The vehicle additionally includes at least one sensor configured to provide signals indicative of a location and velocity of an object external to the vehicle relative to the vehicle. The vehicle further includes at least one controller in communication with the at least one actuator and the at least one sensor. The at least one controller is configured to, in response to a signal from the at least one sensor indicating that a relative velocity between a rearward object and the vehicle exceeds a first threshold and a distance between the rearward object and the vehicle falls below a second threshold, automatically control the at least one actuator to maneuver the vehicle from a first lateral position with respect to a current driving lane to a second lateral position with respect to the current driving lane.

In an exemplary embodiment, the at least one controller is further configured to determine a first lateral distance to a first obstacle positioned on a first side of the vehicle and to determine a second lateral distance to a second obstacle positioned on a second side of the vehicle. In response to the first lateral distance being less than the second lateral distance, the second lateral position is nearer the first obstacle than the first lateral position. In response to the second lateral distance being less than the first lateral distance the second lateral position is nearer the second obstacle than the first lateral position.

In an exemplary embodiment, the relative velocity between the rearward object and the vehicle comprises a longitudinal velocity component and a lateral velocity component. In response to the lateral velocity component exceeding a third threshold, a vector from the first lateral position to the second lateral position has an opposite direction to the lateral velocity component.

In an exemplary embodiment, the at least one controller is further configured to, in response to a signal from the at least one sensor indicating that a relative velocity between the rearward object and a first obstacle positioned on a first side of the vehicle exceeds a threshold, automatically control the at least one actuator to maneuver the vehicle from the first lateral position to the second lateral position, the second lateral position being further from the first obstacle than the first lateral position. In such embodiments, the at least one controller may be further configured to, in response to the signal from the at least one sensor indicating that a relative velocity between the rearward object and a first obstacle positioned on a first side of the vehicle exceeds a threshold, automatically control the at least one actuator to decelerate the vehicle.

A method of controlling a vehicle according to the present disclosure includes providing the vehicle with at least one actuator configured to control vehicle steering, shifting, acceleration, or braking, at least one sensor configured to provide signals indicative of a location and velocity of an object external to the vehicle relative to the vehicle, and at least one controller in communication with the at least one actuator and the at least one sensor. The method also includes determining, via the controller, a relative velocity between a rearward object and the vehicle based on a signal from the at least one sensor. The method additionally includes determining, via the controller, a distance between the rearward object and the vehicle based on the signal from the at least one sensor. The method further includes, in response to the relative velocity exceeding a first calibrated threshold and the distance falling below a second calibrated threshold, automatically controlling the at least one actuator, via the controller, to maneuver the vehicle from a first lateral position with respect to a current driving lane to a second lateral position with respect to the current driving lane.

In an exemplary embodiment, the method additionally includes determining, via the controller, a first lateral distance to a first obstacle positioned on a first side of the vehicle and a second lateral distance to a second obstacle positioned on a second side of the vehicle. In response to the first lateral distance being less than the second lateral distance the second lateral position is nearer the first obstacle than the first lateral position, and in response to the second lateral distance being less than the first lateral distance the second lateral position is nearer the second obstacle than the first lateral position.

In an exemplary embodiment, the relative velocity between the rearward object and the vehicle comprises a longitudinal velocity component and a lateral velocity component, and in response to the lateral velocity component exceeding a third threshold, a vector from the first lateral position to the second lateral position has an opposite direction to the lateral velocity component.

In an exemplary embodiment, the method additionally includes, in response to a signal from the at least one sensor indicating that a relative velocity between the rearward object and a first obstacle positioned on a first side of the vehicle exceeds a threshold, automatically controlling the at least one actuator, via the controller, to maneuver the vehicle from the first lateral position to the second lateral position, the second lateral position being further from the first obstacle than the first lateral position. In such embodiments, the method may further include, in response to the signal from the at least one sensor indicating that a relative velocity between the rearward object and a first obstacle positioned on a first side of the vehicle exceeds a threshold, automatically controlling the at least one actuator, via the controller, to decelerate the vehicle.

Embodiments according to the present disclosure provide a number of advantages. For example, the present disclosure provides a system and method for controlling an automotive vehicle to autonomously maneuver to provide space into which rearward vehicles may maneuver, and thereby reduce a likelihood of being struck by the rearward vehicle.

The above and other advantages and features of the present disclosure will be apparent from the following

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
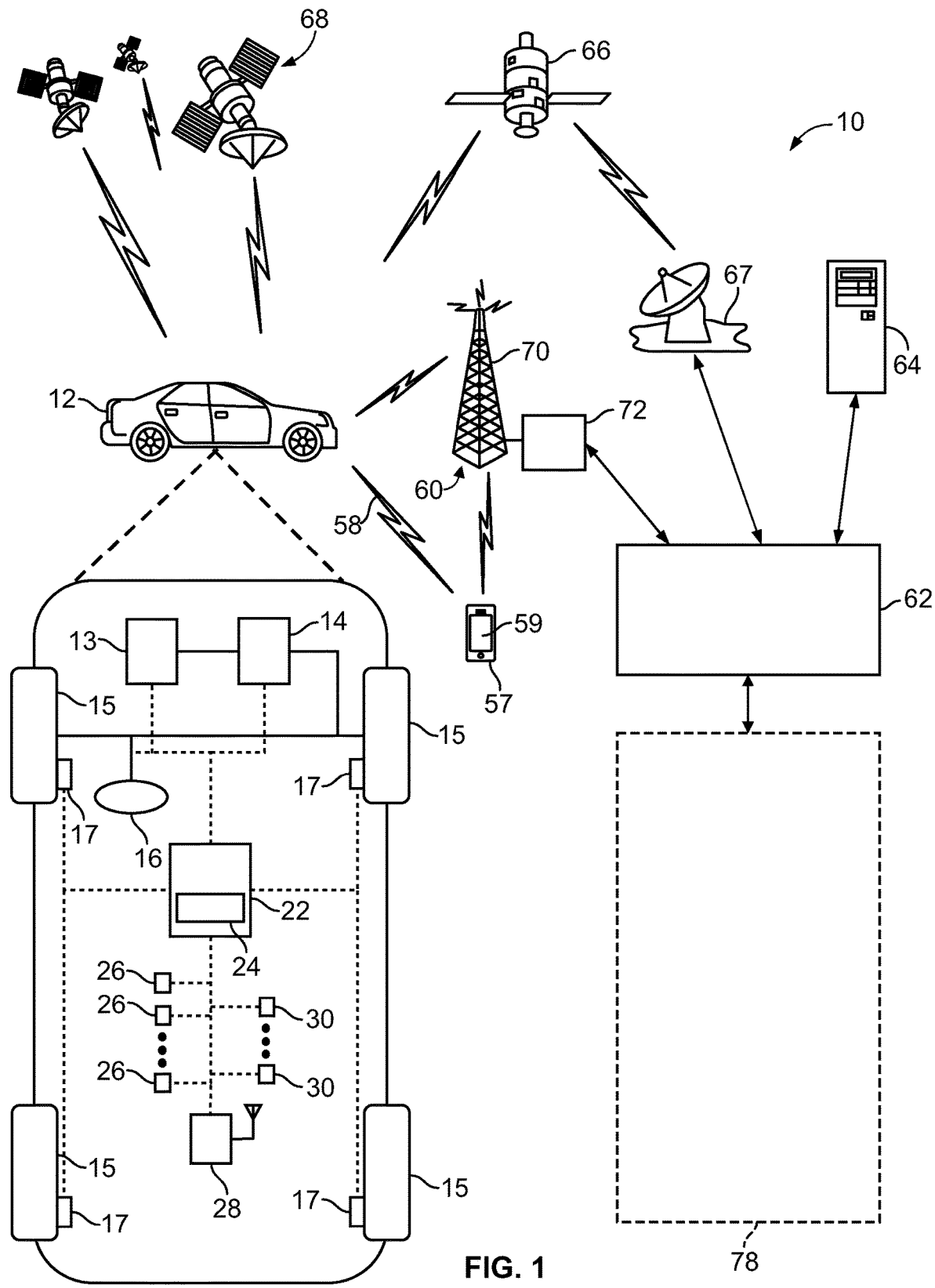
FIG. 1 is a schematic diagram of a communication system including an autonomously controlled vehicle according to an embodiment of the present disclosure.

FIG. 1 schematically illustrates an operating environment that comprises a mobile vehicle communication and control system 10 for a motor vehicle 12. The motor vehicle 12 may be referred to as a host vehicle. The communication and control system 10 for the host vehicle 12 generally includes one or more wireless carrier systems 60, a land communications network 62, a computer 64, a mobile device 57 such as a smart phone, and a remote access center 78.

The host vehicle 12, shown schematically in FIG. 1, is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. The host vehicle 12 includes a propulsion system 13, which may in various embodiments include an internal combustion engine, an electric machine such as a traction motor, and/or a fuel cell propulsion system.

The host vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The host vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The host vehicle 12 additionally includes a steering system 16. While depicted as including a steering wheel for illustrative purposes, in some embodiments contemplated within the scope of the present disclosure, the steering system 16 may not include a steering wheel.

The host vehicle 12 includes a wireless communications system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, wireless communications systems configured to communicate via additional or alternate wireless communications standards, such as IEEE 802.11 and cellular data communication, are also considered within the scope of the present disclosure.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Three automation system. A Level Three system indicates "Conditional Automation", referring to the driving mode-specific performance by an automated driving system of all aspects of the dynamic driving task with the expectation that the human driver will respond appropriately to a request to intervene.

Other embodiments according to the present disclosure may be implemented in conjunction with so-called Level One or Level Two automation systems. A Level One system indicates "driver assistance", referring to the driving mode-specific execution by a driver assistance system of either steering or acceleration using information about the driving environment and with the expectation that the human driver perform all remaining aspects of the dynamic driving task. A Level Two system indicates "Partial Automation", referring to the driving mode-specific execution by one or more driver assistance systems of both steering and acceleration using information about the driving environment and with the expectation that the human driver perform all remaining aspects of the dynamic driving task.

Still other embodiments according to the present disclosure may also be implemented in conjunction with so-called Level Four or Level Five automation systems. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

FIG. 1 illustrates several networked devices that can communicate with the wireless communication system 28 of the host vehicle 12. One of the networked devices that can communicate with the host vehicle 12 via the wireless communication system 28 is the mobile device 57. The mobile device 57 can include computer processing capability, a transceiver capable of communicating signals 58 using a short-range wireless protocol, and a visual smart phone display 59. The computer processing capability includes a microprocessor in the form of a programmable device that includes one or more instructions stored in an internal memory structure and applied to receive binary input to create binary output. In some embodiments, the mobile device 57 includes a GPS module capable of receiving signals from GPS satellites 68 and generating GPS coordinates based on those signals. In other embodiments, the mobile device 57 includes cellular communications functionality such that the mobile device 57 carries out voice and/or data communications over the wireless carrier system 60 using one or more cellular communications protocols, as are discussed herein. The visual smart phone display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, analog technologies such as AMPS, or digital technologies such as CDMA (e.g., CDMA2000) or GSM/GPRS. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the host vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the host vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the host vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the host vehicle 12, the remote access center 78, the mobile device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the host vehicle 12. The computer 64 may be in communication with at least one supplemental vehicle in addition to the host vehicle 12. The host vehicle 12 and any supplemental vehicles may be collectively referred to as a fleet.

Figure 2:
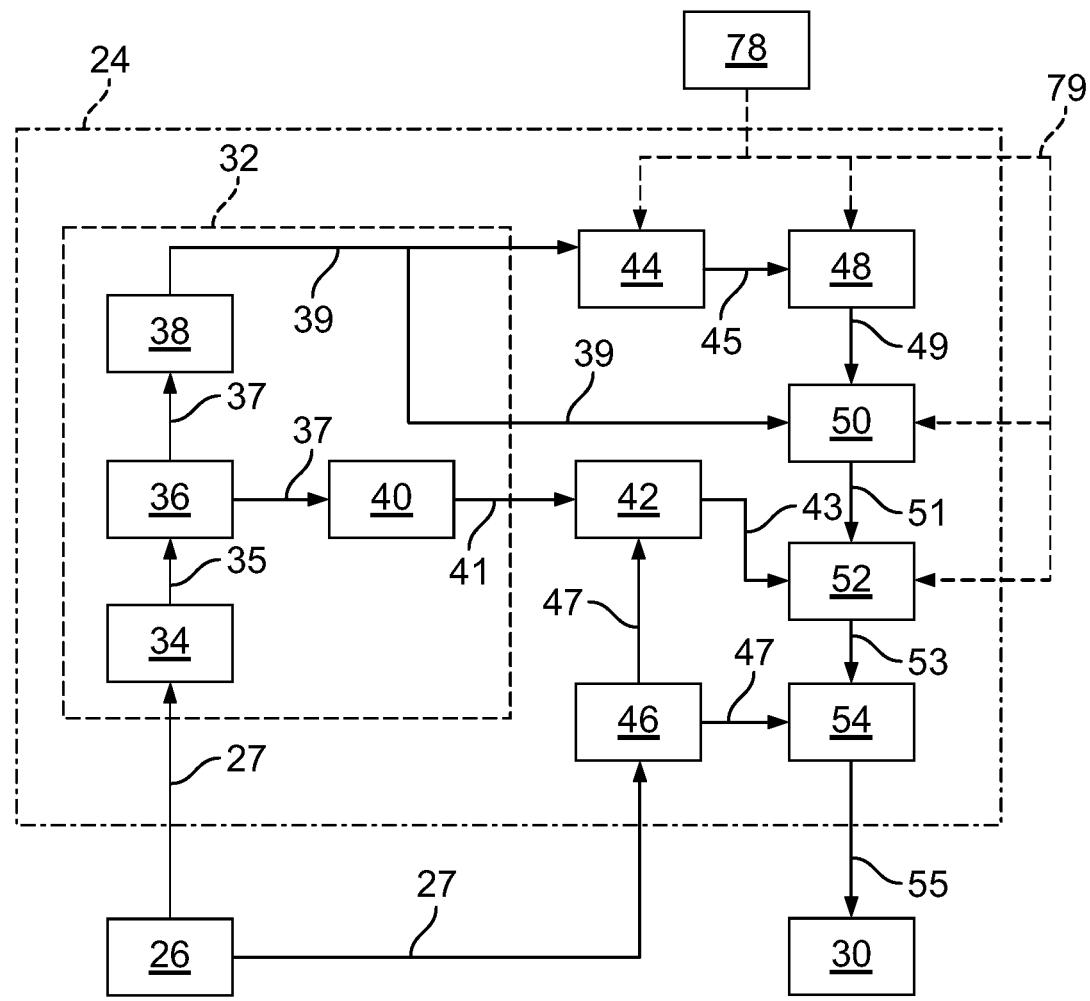
FIG. 2 is a schematic block diagram of an automated driving system (ADS) for a vehicle according to an embodiment of the present disclosure.

As shown in FIG. 2, the ADS 24 includes multiple distinct systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LIDAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation model 36 include, but are not limited to, freespace detection and high level tracking that fuses data from RADAR tracks, LIDAR segmentation, LIDAR classification, image classification, object shape fit models, semantic information, motion prediction, raster maps, static obstacle maps, and other sources to produce high quality object tracks. The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the position and orientation of the host vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the host vehicle 12 during operation and mapping data "pushed" to the host vehicle 12 via the wireless communication system 28. The localization and mapping module 40 updates previous map data with the new information (e.g., new lane markings, new building structures, addition or removal of constructions zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation. The localization and mapping module 40 generates a localization and mapping output 41 that includes the position and orientation of the host vehicle 12 with respect to detected obstacles and road features.

A vehicle odometry module 46 receives data 27 from the vehicle sensors 26 and generates a vehicle odometry output 47 which includes, for example, vehicle heading and velocity information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. The interpretation module 48 generates an interpreted output 49 that includes additional input provided by the remote access center 78, if any.

A path planning module 50 processes and synthesizes the object prediction output 39, the interpreted output 49, and additional routing information 79 received from an online database or the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

Figure 3:
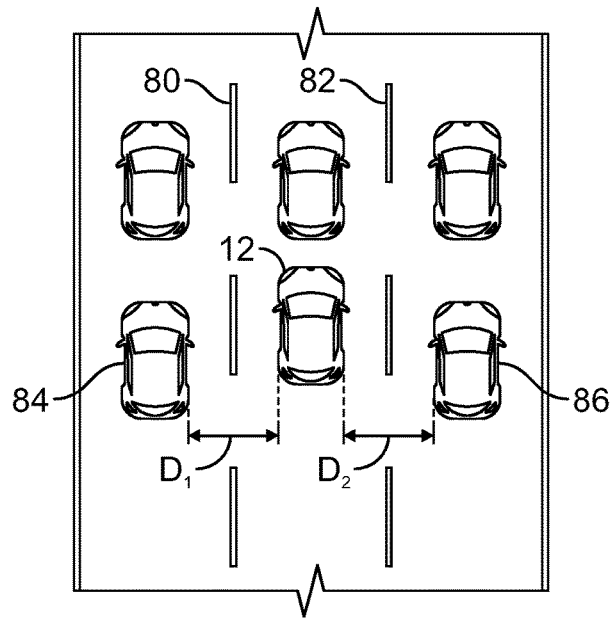
FIG. 3 is a first illustrative representation of a vehicle according to an embodiment of the present disclosure.

The ADS 24 may be configured to, in nominal driving conditions, maintain the host vehicle 12 approximately centered in a driving lane. This arrangement is illustrated in FIG. 3. In this illustrative example, the host vehicle 12 is positioned approximately equidistant between a driver-side lane marking 80 and a passenger-side lane marking 82. In this illustrative embodiment, a first obstacle 84 is positioned to a first side of the host vehicle 12 and a second obstacle 86 is positioned to a second side of the host vehicle 12. In this illustration the first obstacle 84 is a vehicle positioned to a driver side of the host vehicle 12 and the second obstacle 86 is a vehicle positioned to a passenger side of the host vehicle 12. However, the first obstacle 84 and second obstacle 86 may include other physical obstructions such as buildings, guardrails, construction barrels, or any other physical obstacle. The host vehicle 12 is spaced from the first obstacle 84 by a first lateral spacing $D_1$ and from the second obstacle 86 by a second lateral spacing $D_2$. As used here, lateral refers to a side-to-side direction, i.e. generally orthogonal to a fore-aft axis of the host vehicle 12.

While the above-described behavior may be desirable under typical operating conditions, as discussed below, in some driving scenarios it may be preferable to vary the relative spacing between the host vehicle 12 and proximate objects.

Figure 4:
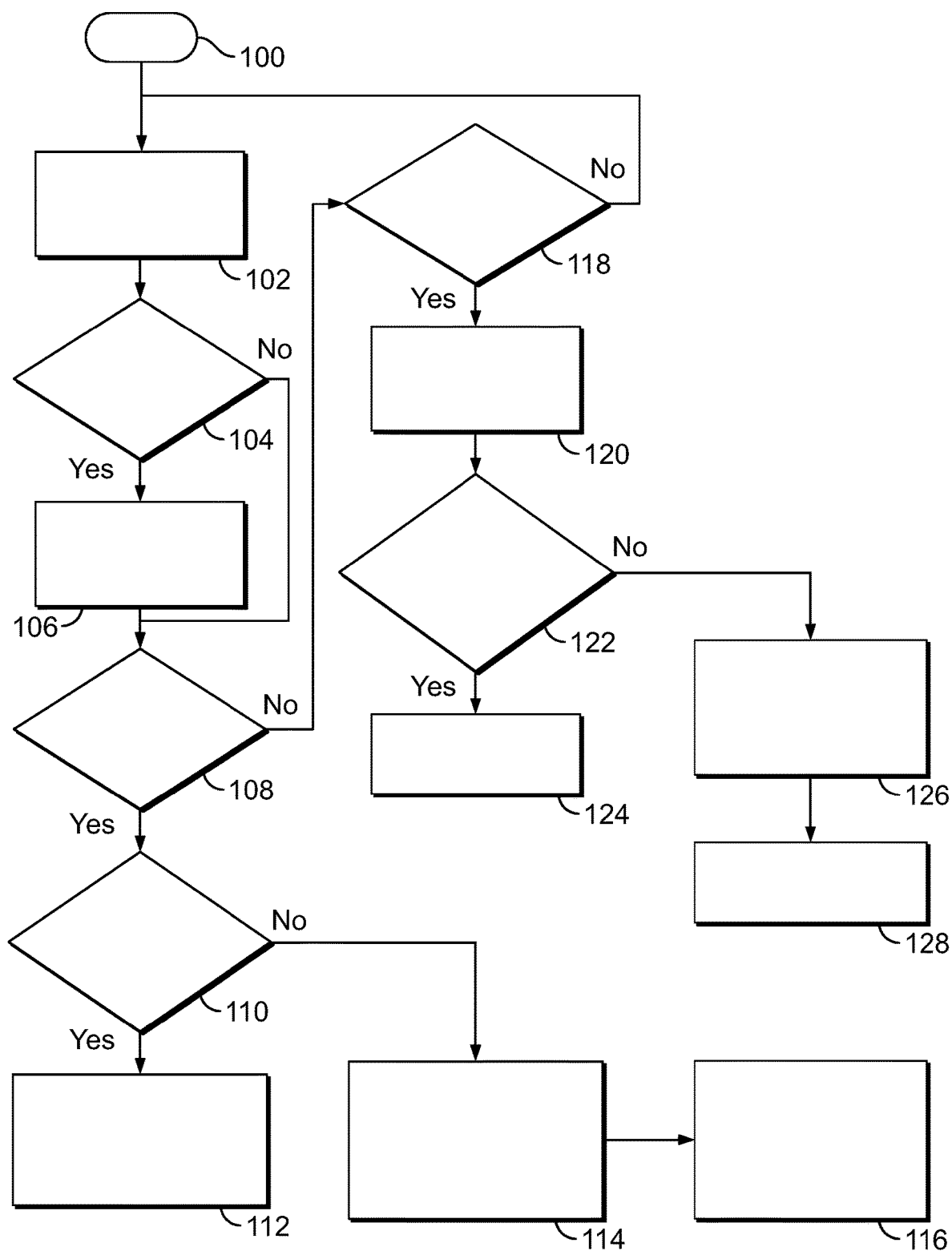
FIG. 4 is a flowchart representation of a method of controlling a vehicle according to an embodiment of the present disclosure.

Referring now to FIG. 4, a method of controlling a vehicle according to a first embodiment of the present disclosure is illustrated in flowchart form. The method begins at block 100. In an exemplary embodiment, the method is performed by the controller 22 in conjunction with one or more of the actuators 30 based on signals from one or more of the sensors 26. However, aspects of the present disclosure may be implemented in ways other than described above.

An initial lane and lateral spacing are selected, as illustrated at block 102. In an exemplary embodiment, this is performed by the ADS 24, e.g. the path planning module 50, according to a nominal navigation algorithm. The lateral spacing may be calculated based on a lateral distance between the host vehicle 12 and proximate objects, e.g. as illustrated at $D_1$ or $D_2$ in FIG. 3, or calculated based on a lateral distance between the host vehicle 12 and lane markings.

A determination is made of whether a front threat is detected, as illustrated at operation 104. A front threat refers to a driving scenario in which a relatively high risk of the host vehicle 12 colliding with a forward object ahead of the host vehicle 12 is present. This determination may be made by the controller 22 based on signals from one or more of the sensors 26. In an exemplary embodiment, the determination of operation 104 is satisfied in response to the signal(s) indicating that a relative velocity between the host vehicle 12 and the forward object, e.g. a vehicle ahead of the host vehicle 12, exceeds a first threshold when the distance is below a second threshold. The first threshold and second threshold may be selected based on vehicle-specific characteristics, e.g. braking characteristics. This determination may be performed in a generally fashion to known autonomous braking systems.

In response to the determination of operation 104 being positive, autonomous braking is executed, as illustrated at block 106. In an exemplary embodiment, this is performed by the controller 22 in conjunction with the brakes 17. This operation may be performed in a generally fashion to known autonomous braking systems.

Subsequent the autonomous braking initiation at block 106, or in response to the determination of operation 104 being negative, a determination is made of whether a rear threat is detected, as illustrated at operation 108. A rear threat refers to a driving scenario in which a relatively high risk of the host vehicle 12 being struck by a rearward object aft of the host vehicle 12 is present. This determination may be made by the controller 22 based on signals from one or more of the sensors 26. In an exemplary embodiment, the determination of operation 108 is satisfied in response to the signal(s) indicating that a relative velocity between the host vehicle 12 and the rearward object, e.g. a vehicle behind the host vehicle 12, exceeds a third threshold when the distance is below a fourth threshold. The third threshold and fourth threshold may be selected based on vehicle-specific characteristics, e.g. braking characteristics.

In response to the determination of operation 108 being positive, a determination is made of whether the rearward object is moving laterally relative to the host vehicle 12. Such behavior is indicative that the object behind the host vehicle 12 is attempting to maneuver to the side of the host vehicle 12 to avoid a collision. This determination may be made by the controller 22 based on signals from one or more of the sensors 26. In an exemplary embodiment, the determination may be performed by decomposing a relative velocity vector between the rearward object and the host vehicle 12 into a longitudinal velocity component and a lateral velocity component. The determination of operation 108 may be satisfied in response to the lateral velocity component exceeding a fifth threshold. The fifth threshold may be selected based on vehicle-specific characteristics, e.g. braking characteristics.

In response to the determination of operation 110 being positive, then the host vehicle 12 is controlled to execute a lateral shift in the opposite direction from the lateral motion of the rearward object. In an exemplary embodiment, this is performed by the controller 22 in conjunction with one or more of the actuators 30, e.g. to control the propulsion system 13, steering system 16, and the brakes 17. A lateral shift comprises repositioning the host vehicle 12 at a different lateral spacing relative to proximate objects and/or lane markers, as will be discussed in conjunction with FIG. 5 below. Repositioning the host vehicle 12 in this fashion may thereby provide increased maneuvering room for the rearward object.

In response to the determination of operation 110 being negative, then relative positions of proximate objects to the immediate left and right of the host vehicle 12, if any, are evaluated, as illustrated at block 114. In the exemplary scenario depicted in FIG. 3, this step comprises determining the first lateral spacing $D_1$ and the second lateral spacing $D_2$. In an exemplary embodiment, this step is performed by the controller 22 based on signals from one or more of the sensors 26.

The host vehicle 12 is subsequently controlled to execute a lateral shift, as illustrated at block 116. The direction of the lateral shift is selected to create the greatest available space for collision avoidance. In an exemplary embodiment, this is performed by the controller 22 in conjunction with one or more of the actuators 30, e.g. to control the propulsion system 13, steering system 16, and the brakes 17. If no proximate object is present to the immediate left or right of the host vehicle 12, then the lateral shift may be performed to reposition the vehicle in a direction where there is no proximate object. If proximate objects are present to the immediate left and right of the host vehicle 12, as illustrated in the exemplary scenario of FIG. 3, then the lateral shift may be performed to reposition the vehicle in the direction of the lesser of the first lateral spacing $D_1$ and the second lateral spacing $D_2$.

Returning to operation 108, in response to the determination being negative, a determination is made of whether an adjacent lane threat is detected, as illustrated at operation 118. An adjacent lane threat refers to a driving scenario in which a relatively high risk is present of a first vehicle in a lane adjacent to the host vehicle 12 colliding with a second vehicle in a lane adjacent to the host vehicle 12. This determination may be made by the controller 22 based on signals from one or more of the sensors 26. In an exemplary embodiment, the determination of operation 118 is satisfied in response to the signal(s) indicating that a relative velocity between first and second objects in a lane adjacent the host vehicle 12 exceeds a fifth threshold when a relative distance therebetween is below a sixth threshold.

In response to the determination of operation 118 being negative, control returns to operation 102. The algorithm thereby behaves in a generally similar fashion to known emergency braking systems unless and until a rear threat or adjacent lane threat is detected.

In response to the determination of operation 118 being positive, then the host vehicle 12 is controlled to execute a lateral shift, as illustrated at block 120. The direction of the lateral shift is opposite the direction of the adjacent lane threat. In an exemplary embodiment, this is performed by the controller 22 in conjunction with one or more of the actuators 30, e.g. to control the propulsion system 13, steering system 16, and the brakes 17.

A determination is then made of whether there is adequate room for the adjacent lane vehicle to merge into the driving lane of the host vehicle 12, as illustrated at block 122. In an exemplary embodiment, this determination is performed by the controller 22 based on signals from one or more of the sensor 26. In an exemplary embodiment, the determination of operation 122 is satisfied in response to the signal(s) indicating that a relative distance between the host vehicle 12 and a forward object exceeds a car length.

In response to the determination of operation 122 being positive, then the host vehicle 12 is controlled in a cost mode, as illustrated at block 124. In an exemplary embodiment, this is performed by the controller 22 in conjunction with one or more of the actuators 30, e.g. to discontinue a current throttle request of the propulsion system 13. The host vehicle 12 may thereby automatically ensure that adequate space is provided for the adjacent lane vehicle to merge into the driving lane of the host vehicle 12.

In response to the determination of operation 122 being negative, an evaluation is performed of the braking required to provide adequate space for the adjacent lane vehicle to merge into the driving lane of the host vehicle 12, as illustrated at block 126. In an exemplary embodiment, this is performed by the controller 22 based on signals from one or more of the sensors 26.

Autonomous braking is then executed, as illustrated at block 128. In an exemplary embodiment, this is performed by the controller 22 in conjunction with the brakes 17. The magnitude and timing of applied braking torque may be based on the evaluation of block 126. The host vehicle 12 may thereby ensure that adequate space is provided for the adjacent lane vehicle to merge into the driving lane of the host vehicle 12.

Upon completion of any of the maneuvers in blocks 112, 116, 124, or 128, the algorithm may return to block 102.

Figure 5:
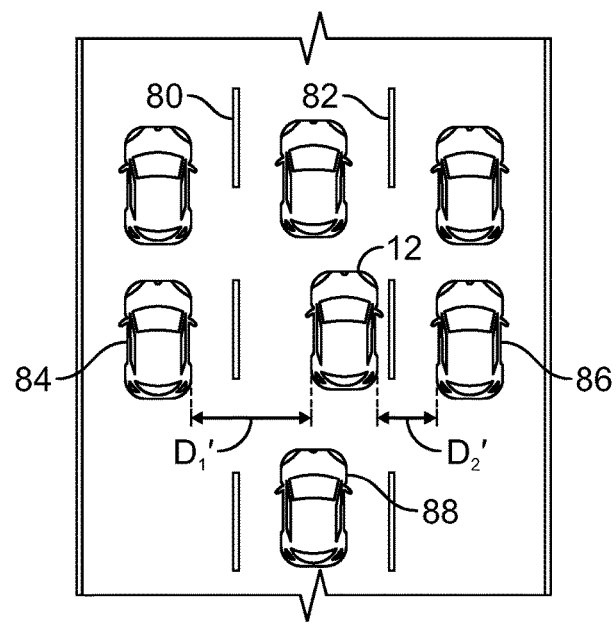
FIG. 5 is a second illustrative representation of a vehicle according to an embodiment of the present disclosure.

Referring now to FIG. 5 in conjunction with FIG. 3, control of a host vehicle 12 according to the method described above is illustrated. In this exemplary scenario, the controller 22 determines that a rearward vehicle 88 constitutes a rear threat, e.g. based on a relative velocity and distance between the rearward vehicle 88 and the host vehicle 12. In this exemplary scenario, the rearward vehicle 88 is not shifting laterally relative to the host vehicle 12. The controller 22 determines the first lateral spacing $D_1$ to the first obstacle 84 and the second lateral spacing $D_2$ to the second obstacle 86, e.g. based on signals from one or more of the sensors 26. In this exemplary scenario, $D_2$ is less than $D_1$, and in response the controller 22 controls one or more actuators 30 to execute a lateral shift in the direction of the second obstacle 86. In the resulting arrangement, illustrated in FIG. 5, the host vehicle 12 has shifted to a second position with respect to the first obstacle 84 and the second obstacle 86. As a result, the lateral spacing to the first obstacle 84 becomes $D_1'$ and the lateral spacing to the second obstacle 86 becomes $D_2'$, where $D_1'>D_1$ and $D_2'<D_2$. In this configuration, $D_1'$ is greater than a width of the rearward vehicle 88, providing a space into which the rearward vehicle 88 may steer to provide additional stopping distance and reduce the risk of collision.

Figure 6:
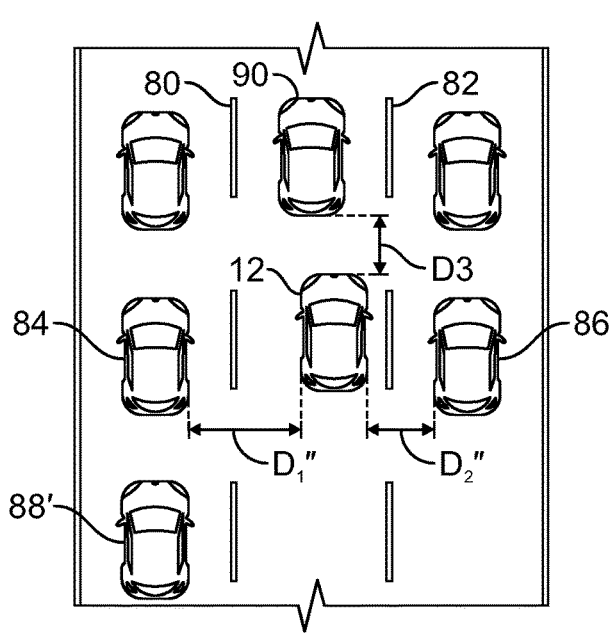
FIG. 6 is a third illustrative representation of a vehicle according to an embodiment of the present disclosure.

Referring now to FIG. 6, control of a host vehicle 12 according to the method described above is further illustrated. In this second exemplary scenario, the controller 22 determines that an adjacent lane vehicle 88' constitutes an adjacent lane threat, e.g. based on a relative velocity and distance between the adjacent lane vehicle 88' and the first obstacle 84. The controller 22 controls one or more actuators 30 to execute a lateral shift in the direction of the second obstacle 86, i.e. away from the adjacent lane threat. In the resulting arrangement, illustrated in FIG. 6, the host vehicle 12 has shifted to a third position with respect to the first obstacle 84 and the second obstacle 86. As a result, the lateral spacing to the first obstacle 84 becomes $D_1''$ and the lateral spacing to the second obstacle 86 becomes $D_2''$, where $D_1''>D_1$ and $D_2''<D_2$. In this configuration, $D_1''$ is greater than a width of the adjacent lane vehicle 88', providing a space into which the adjacent lane vehicle 88' may steer to provide additional stopping distance and reduce the risk of collision. Furthermore, the controller 22 evaluates a relative distance $D_3$ between the host vehicle 12 and a forward vehicle 90. In response to $D_3$ being less than a car length, the controller 22 automatically controls vehicle brakes 17 as discussed above to decelerate the host vehicle 12 and provide a gap into which the adjacent lane vehicle 88' may merge.

As may be seen, the present disclosure provides a system and method for controlling an automotive vehicle to autonomously maneuver to provide space into which rearward vehicles may maneuver, and thereby reduce a likelihood of being struck by the rearward vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
at least one actuator configured to control vehicle steering, shifting, acceleration, or braking;
at least one sensor configured to provide signals indicative of a location and velocity of an object external to the vehicle relative to the vehicle; and
at least one controller in communication with the at least one actuator and the at least one sensor, the at least one controller being configured to, in response to a signal from the at least one sensor indicating that a relative velocity between a rearward object and the vehicle exceeds a first threshold and a distance between the rearward object and the vehicle falls below a second threshold, automatically control the at least one actuator to maneuver the vehicle from a first lateral position with respect to a current driving lane to a second lateral position with respect to the current driving lane, wherein the at least one controller is further configured to determine a first lateral distance to a first obstacle positioned on a first side of the vehicle and to determine a second lateral distance to a second obstacle positioned on a second side of the vehicle, wherein in response to the first lateral distance being less than the second lateral distance the second lateral position is nearer the first obstacle than the first lateral position, and wherein in response to the second lateral distance being less than the first lateral distance the second lateral position is nearer the second obstacle than the first lateral position.

2. A method of controlling a vehicle, comprising:
providing the vehicle with at least one actuator configured to control vehicle steering, shifting, acceleration, or braking, at least one sensor configured to provide signals indicative of a location and velocity of an object external to the vehicle relative to the vehicle, and at least one controller in communication with the at least one actuator and the at least one sensor;
determining, via the controller, a relative velocity between a rearward object and the vehicle based on a signal from the at least one sensor;
determining, via the controller, a distance between the rearward object and the vehicle based on the signal from the at least one sensor;
in response to the relative velocity exceeding a first calibrated threshold and the distance falling below a second calibrated threshold, automatically controlling the at least one actuator, via the controller, to maneuver the vehicle from a first lateral position with respect to a current driving lane to a second lateral position with respect to the current driving lane; and
in response to a signal from the at least one sensor indicating that a relative velocity between the rearward object and a first obstacle positioned on a first side of the vehicle exceeds a threshold, automatically controlling the at least one actuator, via the controller, to maneuver the vehicle from the first lateral position to the second lateral position, the second lateral position being further from the first obstacle than the first lateral position.

3. The method of claim 2, further comprising, in response to the signal from the at least one sensor indicating that a relative velocity between the rearward object and a first obstacle positioned on a first side of the vehicle exceeds a threshold, automatically controlling the at least one actuator, via the controller, to decelerate the vehicle.

4. An automotive vehicle comprising:
at least one actuator configured to control vehicle steering, shifting, acceleration, or braking;
at least one sensor configured to provide signals indicative of a location and velocity of an object external to the vehicle relative to the vehicle; and
at least one controller in communication with the at least one actuator and the at least one sensor, the at least one controller being configured to, in response to a signal from the at least one sensor indicating that a relative velocity between a rearward object and the vehicle exceeds a first threshold and a distance between the rearward object and the vehicle falls below a second threshold, automatically control the at least one actuator to maneuver the vehicle from a first lateral position with respect to a current driving lane to a second lateral position with respect to the current driving lane, wherein the relative velocity between the rearward object and the vehicle comprises a longitudinal velocity component and a lateral velocity component, and wherein in response to the lateral velocity component exceeding a third threshold, a vector from the first lateral position to the second lateral position has an opposite direction to the lateral velocity component.

* * * * *